United States Patent
Tezuka

(10) Patent No.: US 6,711,704 B1
(45) Date of Patent: Mar. 23, 2004

(54) TRANSMISSION METHOD USING ERROR CORRECTION PROCESSING

(75) Inventor: Hiroshi Tezuka, Tokyo (JP)

(73) Assignee: NEC Corporation, Tokyo (JP)

( * ) Notice: Subject to any disclaimer, the term of this patent is extended or adjusted under 35 U.S.C. 154(b) by 474 days.

(21) Appl. No.: 09/596,063

(22) Filed: Jun. 16, 2000

(30) Foreign Application Priority Data

Jun. 16, 1999 (JP) .......................................... 11-169084

(51) Int. Cl.⁷ .............................................. G01R 31/28
(52) U.S. Cl. ...................................... 714/712; 370/474
(58) Field of Search ............... 714/712; 370/241.1–246, 370/274, 293, 315–328, 396, 462, 487, 377, 395.1, 399, 474, 392, 224; 709/223–226; 375/357

(56) References Cited

U.S. PATENT DOCUMENTS

| | | | |
|---|---|---|---|
| 5,771,231 A | * 6/1998 | Watanabe | 370/377 |
| 5,822,299 A | * 10/1998 | Goodman | 370/228 |
| 6,356,561 B1 | * 3/2002 | Lau et al. | 370/462 |

FOREIGN PATENT DOCUMENTS

| | | | | |
|---|---|---|---|---|
| EP | 0 555 998 A2 | 8/1993 | ............. | H04L/1/00 |
| EP | 0 629 060 A1 | 12/1994 | ............. | H04L/1/00 |
| EP | 0 647 066 A2 | 4/1995 | .......... | H04N/5/926 |
| JP | 61-181230 | 8/1986 | ............. | H04J/3/00 |
| JP | 2-253734 | 10/1990 | ............. | H04J/3/00 |
| JP | 7-131400 | 5/1995 | ............. | H04B/7/24 |
| JP | 9-130355 | 5/1997 | ............. | H04J/3/00 |
| WO | WO 98/12820 | 3/1998 | .......... | H03M/13/12 |

OTHER PUBLICATIONS

Ballintine "A Proposed Implementation for a Digital 'Wrapper' for Och Overhead; Lucent Technologies, T1X1.5/99–003; Jan. 14, 1999."*
Tezuka et al. "2.677 Gbit/s–throughput forward error correction LSI for long–haul optical transmission systems; 24th European Conference on Optical Communication, 1998. Pp: 561–562 vol. 1; Sep. 1998".*
Soda et al. "One–chip receiver IC for 2.4 Gb/s optical communication Systems; Custom Integrated Circuits Conference, Proceedings of the IEEE. Pp: 99–102; May 1995".*
Ballintine, J. "A Proposed Implementation for a Digital "Wrapper" for Och Overhead", Lucent Technologies, T1X1.5/99–003 Jan. 12–14, 1999.

* cited by examiner

Primary Examiner—Guy J. Lamarre
(74) Attorney, Agent, or Firm—McGinn & Gibb, PLLC

(57) ABSTRACT

A transmission method allowing the reduced amount of hardware in a repeater is disclosed. The overhead portion of a frame is divided into a selected overhead portion for error-correction processing and the non-selected overhead portion for error-correction processing. The non-selected overhead portion such as an overhead for network management can be transferred without error-correction processing, Therefore, a repeater without error-correction processing of the non-selected overhead portion can be used and allows easy insertion and termination resulting in the reduced total amount of hardware in the repeater.

19 Claims, 7 Drawing Sheets

BASIC FRAME STRUCTURE

TRANSMISSION METHOD USING ERROR CORRECTION PROCESSING

BACKGROUND OF THE INVENTION

1. Field of the Invention

The present invention relates to a communication network system including termination stations and repeaters, and in particular to a transmission method and system for large-capacity and long-distance transmission requiring error correction processing.

2. Description of the Related Art

With the recent vast Increase in data transmission capacity, SONET (Synchronous Optical NETwork) or SDH (Synchronous Digital Hierarchy) has been employed as a basic transmission scheme for a fiber-optic communication system.

In submarine transmission systems, the ITU-T Recommendation G.975. "Forward Error Correction for Submarine Systems," specifies a frame structure for transporting STM-16 payloads with FEC (Forward Error Correction).

In land transmission systems, similarly, error-correction techniques come under consideration to meet high-speed data transmission lines. For example, a frame format similar to the above frame structure in submarine transmission systems is proposed for the land transmission systems (see "A proposed implementation for a digital "Wrapper" for Och overhead", James Ballintine, Lucent Technologies, T1X1.5/99-003 Jan. 12–14, 1999.

According to the frame structure proposed by James Ballintine, a frame is formed by multiplexing sixteen 255-byte subframes, each subframe consisting of a 1-byte overhead (OCh-OH: Optical Channel-Overhead), a 238-byte payload (OCh-PE: Optical Channel-Payload Envelope), and a 16-byte redundant code (FEC: Forward Error Correction). The error correction process (here, parity check) Is performed for each subframe and the calculated value is written into the redundancy check bytes. In other words, the FEC process is applied along the line of its corresponding subframe from the OCh-OH to the OCh-PE.

In submarine transmission systems, each repeater is provided with an optical amplifier and therefore it is not necessary to terminate information of an input optical signal at each repeater.

In land transmission systems, however, an input optical signal is converted into an electric signal and it is necessary to terminate information of an input signal at each repeater In this case, the error-correction function must be terminated at each repeater, resulting in increased amount of hardware in each repeater.

SUMMARY OF THE INVENTION

It is an object of the present invention to provide a transmission method and system allowing the amount of hardware to be reduced in a repeater of a transmission system.

It is another object of the present invention to provide a transmission method and system allowing easy termination and insertion of necessary information without increasing in the amount of hardware at a repeater.

According to an aspect of the present invention, a method for transferring a signal from a first termination station to a second termination station through at least one repeater, said signal having a frame structure composed of an overhead portion, a payload portion, and an error-correction code portion, includes the step of; dividing said overhead portion into a selected overhead portion to be used for error correction and a non-selected overhead portion not to be used for error correction; and transferring said signal from said termination site to said other termination site through said at least one repeater.

The first termination station may insert first overhead information to said selected overhead portion of said frame to produce an intermediate signal, perform error-correction encoding of the intermediate signal, insert second overhead information to said non-selected overhead portion of an encoded intermediate signal to produce a transmission signal, and transmit the transmission signal to said second termination station.

The second termination station may receive a signal from said first termination station terminate said non-selected overhead portion of a received signal to produce an intermediate signal, perform error-correction decoding of the intermediate signal, and terminates said selected overhead portion of the intermediate signal to produce received data.

A repeater may receive a signal from said first termination station, terminate said non-selected overhead portion of a received signal to produce an intermediate signal, insert first overhead information to said selected overhead portion of said intermediate signal to produce a transmission signal and transmit the transmission signal to said second termination station.

A repeater may receive a signal from said first termination station, terminate said non-selected overhead portion of a received signal to produce a first intermediate signal, perform error-correction decoding of the first intermediate signal, terminate said selected overhead portion of the first intermediate signal to produce a second intermediate signal, insert first overhead information to a selected overhead portion of said second intermediate signal to produce a third intermediate signal, perform error-correction encoding of the third intermediate signal, insert second overhead information to said non-selected overhead portion of an encoded third intermediate signal to produce a transmission signal, and transmit the transmission signal to said second termination station.

The overhead portion is preferably divided into a selected overhead portion and a non-selected overhead portion depending on a type of each overhead. The overhead portion may be divided into a selected overhead portion and a non-selected overhead portion depending on whether an overhead includes information required for network management.

According to another aspect of the present invention, a transmission method for transmitting a signal from a first termination station to a second termination station through at least one repeater, said signal having a frame structure composed of a plurality of subframes, each of which includes an overhead a payload, and an error-correction code, Includes the steps of: determining whether said overhead is a selected overhead for error correction, depending on a type of said overhead: when said overhead is a selected overhead for error correction, performing an error-correction process using information which includes said overhead; when said overhead is not a selected overhead for error correction, performing said error-correction process using information from which said overhead is removed; and transmitting the signal from said first termination station to said second termination station through said at least one repeater.

According to further another aspect of the present invention, in a system for transferring a signal from a first termination station to a second termination station through a plurality of repeaters, said signal having a frame structure composed of an overhead portion, a payload portion, and an error-correction code portion, the first termination station comprises: a first selected-overhead inserting section for inserting first overhead information to said selected overhead portion of said frame to produce a first intermediate signal; an encoder for performing error-correction encoding of the first intermediate signal; a first non-selected-overhead inserting section for inserting second overhead information to said non-selected overhead portion of an encoded first intermediate signal to produce a first transmission signal; and a first transmitter for transmitting said first transmission signal to said second termination station.

The second termination station comprises; a second receiver for receiving said second transmission signal from said first termination station through said repeaters; a second non-selected-overhead terminator for terminating said non-selected overhead portion of said second transmission signal to produce a third intermediate signal; a decoder for performing error-correction decoding of the third intermediate signal; and a selected-overhead terminator for terminating said selected overhead portion of a decoded third intermediate signal to produce received data.

At least one of said repeaters comprises; a first receiver for receiving said first transmission signal from a previous stage: a first non-selected-overhead terminator for terminating said non-selected overhead portion of a received signal to produce a second intermediate signal; a second selected-overhead inserting section for inserting third first overhead information to said selected overhead portion of said second intermediate signal to produce a second transmission signal: and a second transmitter for transmitting the second transmission signal to a following stage.

At least one of said repeaters comprises: a third receiver for receiving a signal from a previous stage; a third non-selected-overhead terminator for terminating said non-selected overhead portion of a received signal to produce a fourth intermediate signal; a second decoder for performing error-correction decoding of said fourth intermediate signal; a second selected-overhead terminator for terminating said selected overhead portion of said fourth intermediate signal to produce a fifth intermediate signal: a second selected-overhead inserting section for inserting first overhead information to a selected overhead portion of said fifth intermediate signal to produce a sixth intermediate signal; a second encoder for performing error-correction encoding of the sixth intermediate signal; a third non-selected-overhead inserting section for inserting second overhead information to said non-selected overhead portion of an encoded sixth Intermediate signal to produce a third transmission signal; and a third transmitter for transmitting the transmission signal to a following stage.

As described above, since the overhead portion of a frame is divided into the selected overhead portion and the non-selected overhead portion, the non-selected overhead portion such as an overhead for network management can be transferred without error-correction processing. Therefore, easy termination and insertion of the overhead for network management are allowed in each repeater. Further, a repeater without error-correction processing of the non-selected overhead portion can be used, resulting in the reduced amount of hardware in the repeater.

DETAILED DESCRIPTION OF THE PREFERRED EMBODIMENT

Figure 1:
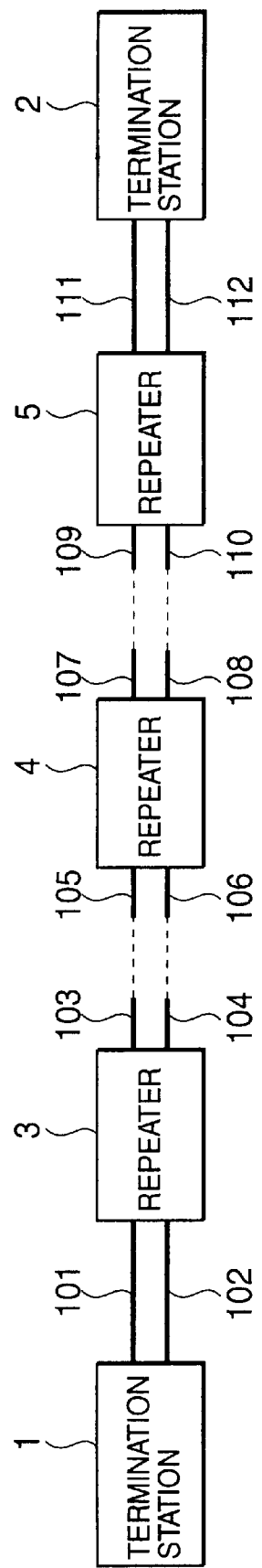
FIG. 1 is a schematic diagram illustrating an example of a transmission system according to an embodiment of the present invention.

As shown in FIG. 1, it is assumed for simplicity that a lightwave network is composed of termination stations 1 and 2 and a plurality of repeaters connected between the termination stations 1 and 2 through optical bidirectional transmission lines. More specifically, the termination station 1 is connected to a repeater 3 through a pair of optical fibers 101 and 102. The repeater 3 is further connected to a next repeater (not shown) through a pair of optical fibers 103 and 104. A repeater 4 is connected to adjacent repeaters (not shown) through a pair of optical fibers 105 and 106 and a pair of optical fibers 107 and 108. A repeater 5 is connected to an adjacent repeater (not shown) through a pair of optical fibers 109 and 110 and to the termination station 2 through a pair of optical fibers 111 and 112.

It Is further assumed that the repeaters 3 and 5 have no error-correction capability and the repeater 4 has the error-correction capability. The repeater 4 having the error-correction capability is needed in the case of the increased amount of error accumulated during transmission between termination stations 1 and 2. When the amount of error is not significantly increased, a repeater such as the repeater 4 having the error-correction capability is not necessarily needed.

In this lightwave network, an optical STM(Synchronous Transfer Mode)-16 signal is transmitted at an approximate bit rate of 2.5 Gb/s. As described later, the STM-16 signal is subject to error-correction encoding.

Figure 2A:
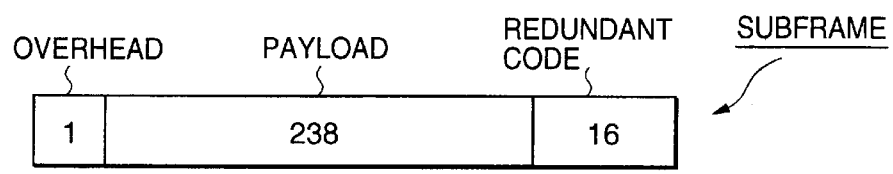
FIG. 2A is a diagram showing the format of a subframe in an optical signal used in the embodiment of the present invention.

As shown in FIG. 2A, a subframe format of the STM-16 signal is composed of a 1-byte overhead (OH), a 238-byte payload, and a 16-byte redundant code (error-correction code).

Figure 2B:
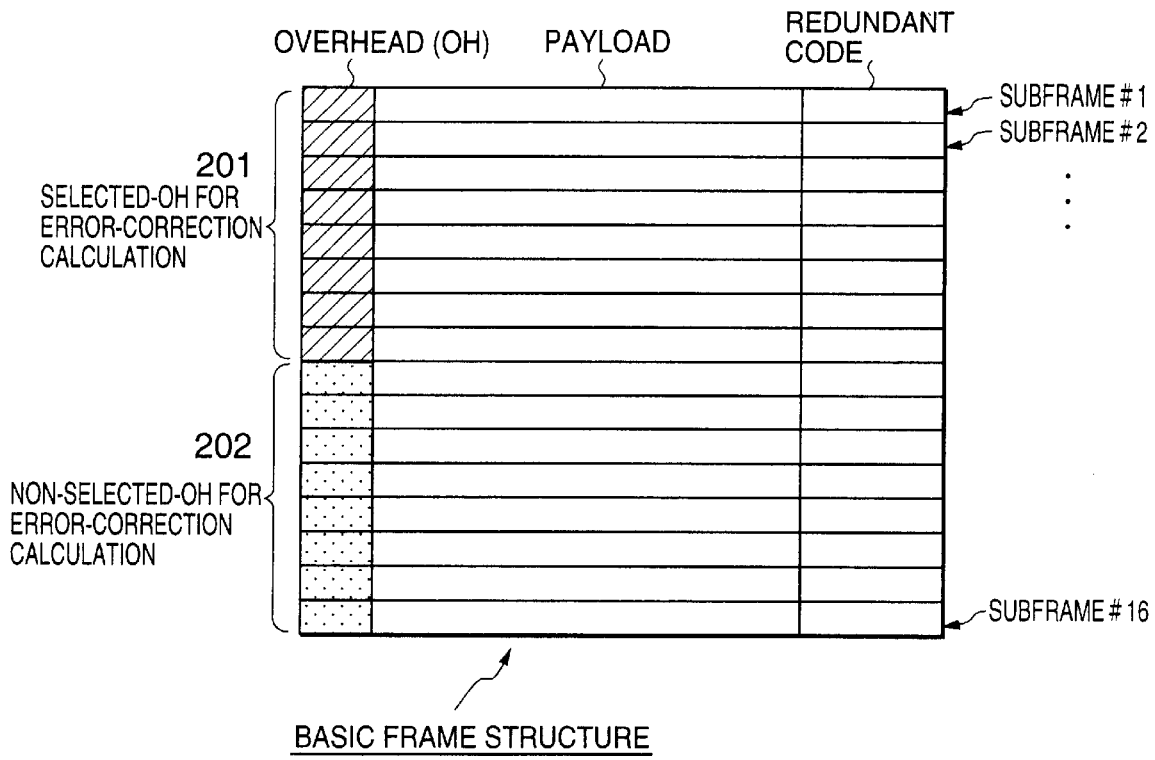
FIG. 2B is a diagram showing the format of a frame formed by multiplexing 16 subframes in the embodiment of the present invention.

As shown in FIG. 2B, sixteen subframes each having the format of FIG. 2A are time-multiplexed to form a frame. The overheads of the frame are selectively included in error-correction calculation. Here, the overhead portion of the frame is divided into a selected overhead portion 201 and a non-selected overhead portion 202.

In the case where the overhead of a subframe belongs in the selected overhead portion 201, the error correction code is calculated over both the overhead and its corresponding payload. Contrarily, in the case where the overhead of a subframe belongs in the non-selected overhead portion 202, the error correction code is calculated over only the payload.

The overhead selection is performed depending on the type of overhead. In this embodiment, when an overhead byte is designed to store information required for network management such as BIP (Bit Interleaved Parity) or information for detecting loss of signal, loss of frame alignment, or the like, the overhead is not selected for error correction calculation. Assuming that the overhead of the subframe #16 includes information required for network management, the overhead of the subframe #16 is a non-selected overhead for error correction processing and therefore the error-correction code of the subframe #16 is calculated over only the payload following the overhead. Assuming that the overhead of the subframe #1 includes information other than required for network management, the overhead of the subframe #1 is a selected overhead for error correction processing and therefore the error-correction code of the subframe #1 is calculated over both the overhead and the payload following it.

TERMINATION STATION

Figure 3:
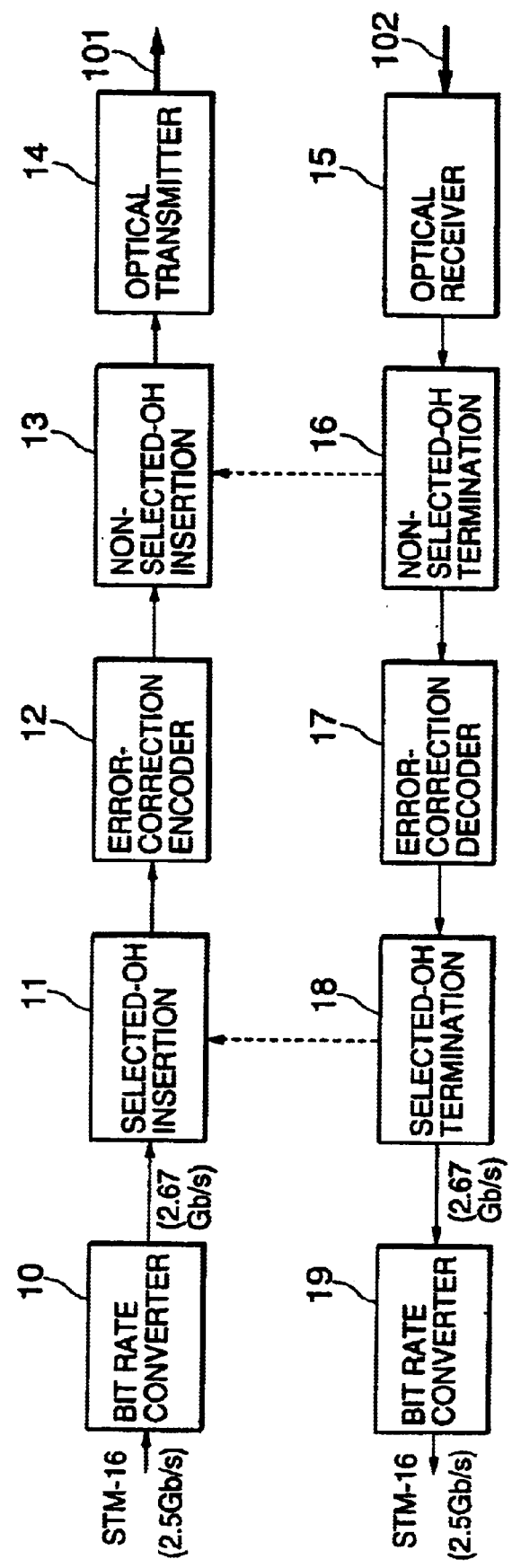
FIG. 3 is a block diagram Illustrating a functional configuration of a termination station according to the embodiment of the present invention.

Referring to FIG. 3, the termination station 1 has a transmission function and a reception function. The transmission function is implemented by a bit rate converter 10, a selected-OH insertion section 11, an error-correction encoder 12, a non-selected-OH insertion section 13, and an optical transmitter 14. The reception function is implemented by an optical receiver 15, a non-selected-OH termination section 16, an error-correction decoder 17, a selected-OH termination section 18, and a bit rate converter 19. The termination station 2 has the same configuration as the terminal station 1.

Figure 4A:
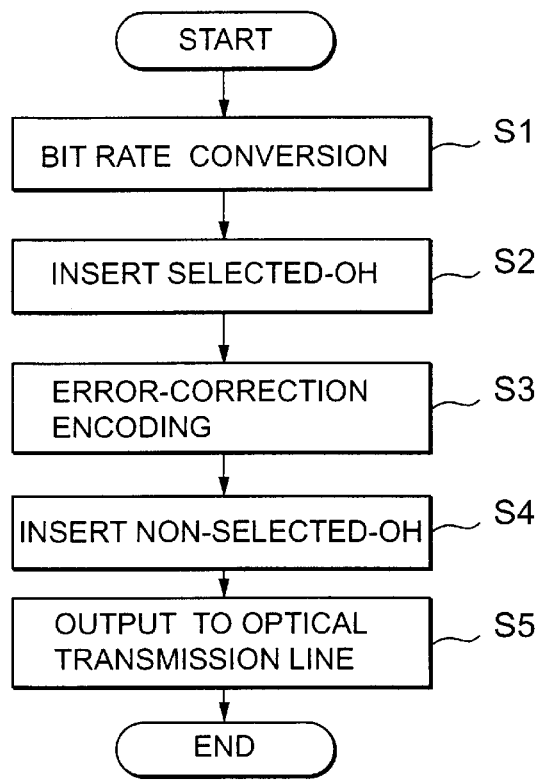
FIG. 4A is a flow chart illustrating a transmission operation of the termination station as shown in FIG. 3.

Referring to FIG. 4A, the transmission operation of the termination station 1 (and 2) will be described hereafter. The bit rate converter 10 converts an input STM-16 signal to 2.67 Gbps by multiplying the input bit rate (2.5 Gbps) by 15/14 (step S1). The selected-OH insertion section 11 inserts necessary information into overheads included in the selected overhead portion 201 for error correction processing (step S2). The selected-OH necessary information is generated based on information received from the selected-OH termination section 18. The error-correction encoder 12 uses the selected overhead and the payload following the selected overhead to perform the error-correction encoding over the selected overhead and the payload (step S3). Thereafter, the non-selected-OH insertion section 13 inserts necessary information into overheads included in the non-selected overhead portion 202 for error correction processing (step S4). The non-selected-OH necessary information is generated based on information received from the non-selected-OH termination section 16. In this manner, an optical signal is generated from the output of the non-selected-OH insertion section 13 and is transmitted to the optical fiber 101 by the optical transmitter 14 (step S5).

Figure 4B:
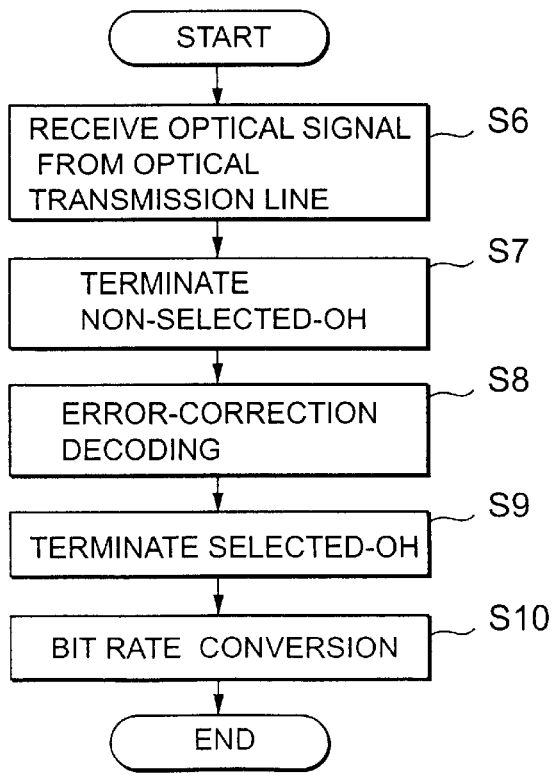
FIG. 4B is a flow chart illustrating a reception operation of the termination station as shown in FIG. 3.

Referring to FIG. 4B, the reception operation of the termination station 1 (and 2) will be described hereafter. When the optical receiver 15 receives an optical signal through the optical fiber 102 (step S6), the non-selected-OH termination section 16 terminates the non-selected overhead of the received signal (step S7). All or part of information of the non-selected overhead Is transferred to the non-selected-OH insertion section 13. Thereafter the error-correction decoder 17 performs the error-correction decoding of the received signal from which the non-selected overhead is removed (step S8). Then, the selected-OH termination section 18 terminates the selected overhead of the output of the error-correction decoder 17 (step S9). All or part of information of the selected overhead is transferred to the selected-OH insertion section 11. The bit rate converter 19 converts the 2.67 Gbps output of the selected-OH termination section 18 to a 2.5 Gbps STM-16 signal by multiplying the received bit rate (2.67 Gbps) by a factor of 14/15 (step S10).

REPEATER WITHOUT ERROR CORRECTION

Figure 5:
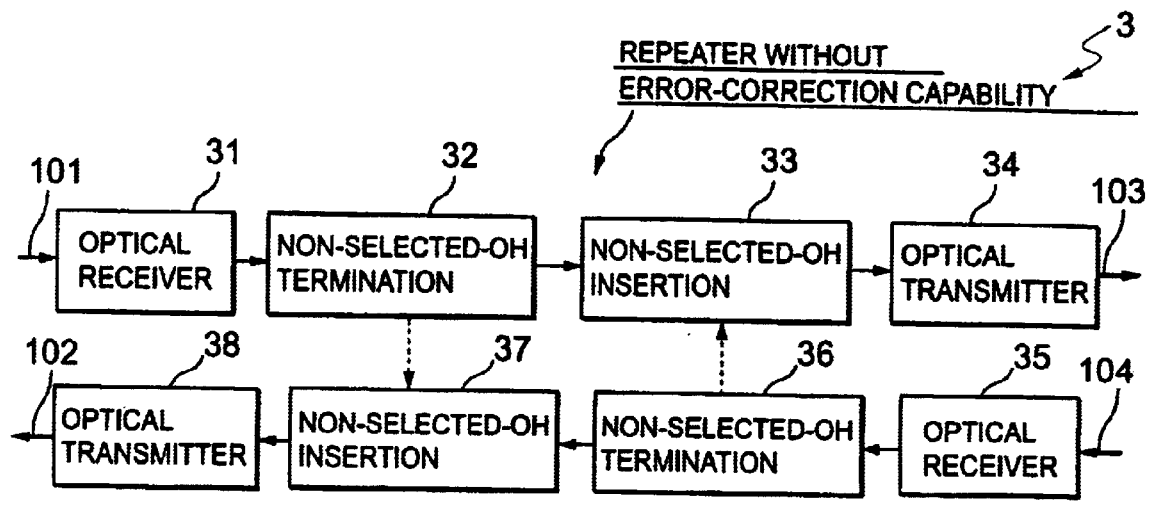
FIG. 5 is a block diagram illustrating a functional configuration of a repeater station having no error-correction capability according to the embodiment of the present invention.

Referring to FIG. 5, a repeater 3 (and 5) has a one-direction transmission system and an opposite-direction transmission system. The one-direction transmission system is composed of an optical receiver 31, a non-selected-OH termination section 32, a non-selected-OH insertion section 33, and an optical transmitter 34. The opposite-direction transmission system is composed of an optical receiver 35, a non-selected-OH termination section 36, a non-selected-OH insertion section 37, and an optical transmitter 38. The one-direction transmission system and the opposite-direction transmission system operate in the same manner.

Figure 6:
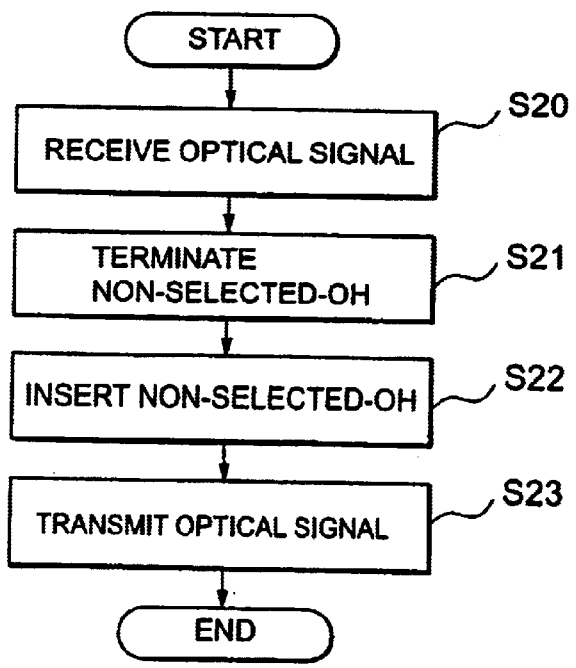
FIG. 6 is a flow chart illustrating an operation of the repeater station as shown in FIG. 5.

Referring to FIG. 6, the transmission operation of the one-direction and opposite-direction transmission systems will be described. When the optical receiver 31 (or 35) receives an optical signal through the optical fiber 101 (or 104) (step S20) the non-selected-OH termination section 32 (or 36) terminates the non-selected overhead of the received signal (step S21). All or part of information of the non-selected overhead such as information for network management is transferred to the non-selected-OH insertion section 37 (or 33). Thereafter, the non-selected-OH insertion section 33 (or 37) inserts necessary information such as information for network management into overheads included in the non-selected overhead portion 202 for error correction processing (step S22). The non-selected-OH necessary information is generated based on information received from the non-selected-OH termination section 36 (or 32). In this manner, an optical signal is generated from the output of the non-selected-OH insertion section 33 (or 37) and is transmitted to the optical fiber 103 (or 102) by the optical transmitter 34 (or 38) (step S23).

As described above, in the repeaters 3 and 5, the error-correction processing is not performed. Therefore, there is no need for error-correction capability but only termination and insertion of non-selected overhead, resulting in the dramatically reduced amount of circuit in the repeater. Such a repeater having no error-correction capability can be installed in a section in which the error correction is not needed.

REPEATER WITH ERROR CORRECTION

Figure 7:
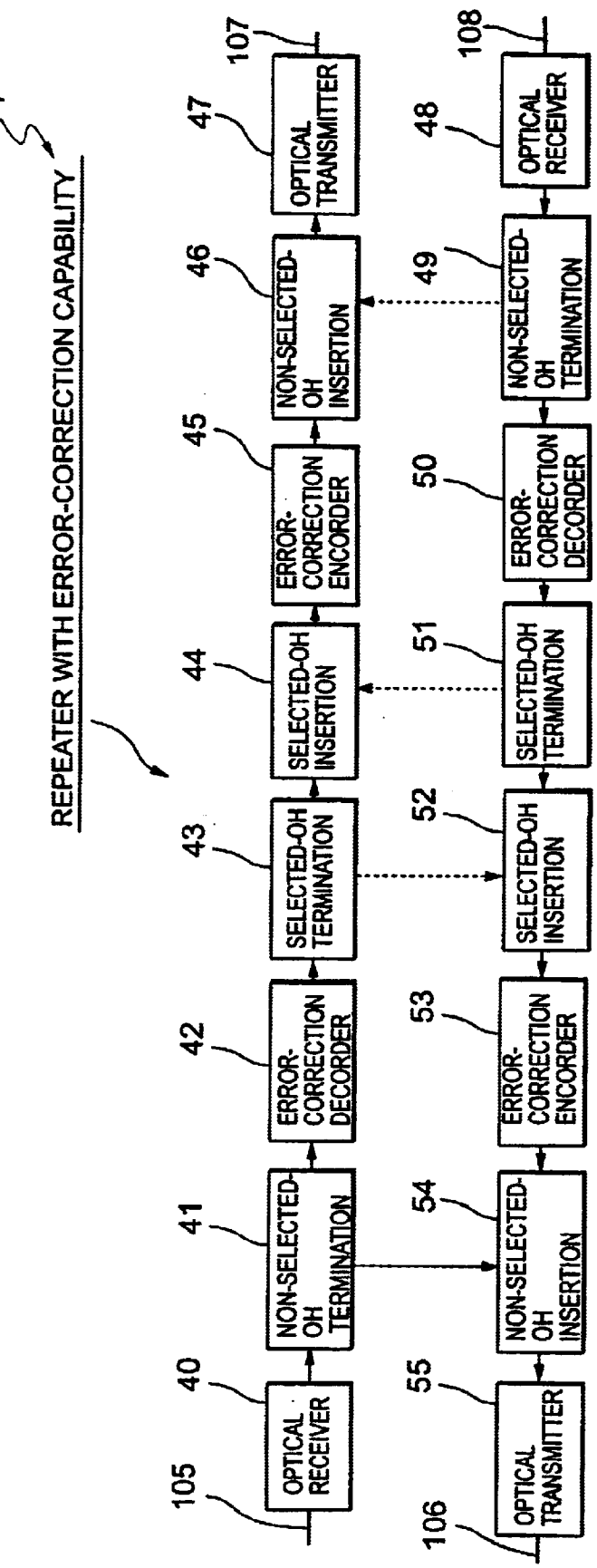
FIG. 7 is a block diagram illustrating a functional configuration of a repeater station having an error-correction capability according to the embodiment of the present Invention.

Referring to FIG. 7, a repeater 4 has a one-direction transmission system and an opposite-direction transmission system. The one-direction transmission system is composed of an optical receiver 40, a non-selected-OH termination section 41, an error-correction decoder 42, a selected-OH termination section 43, a selected-OH insertion section 44, an error-correction encoder 45, a non-selected-OH insertion section 46, and an optical transmitter 47. The opposite-direction transmission system is composed of an optical receiver 48, a non-selected-OH termination section 49, an error-correction decoder 50, a selected-OH termination section 51, a selected-OH insertion section 52, an error-correction encoder 53, a non-selected-OH insertion section 54, and an optical transmitter 55. The one-direction transmission system and the opposite-direction transmission system operate in the same manner.

Figure 8:
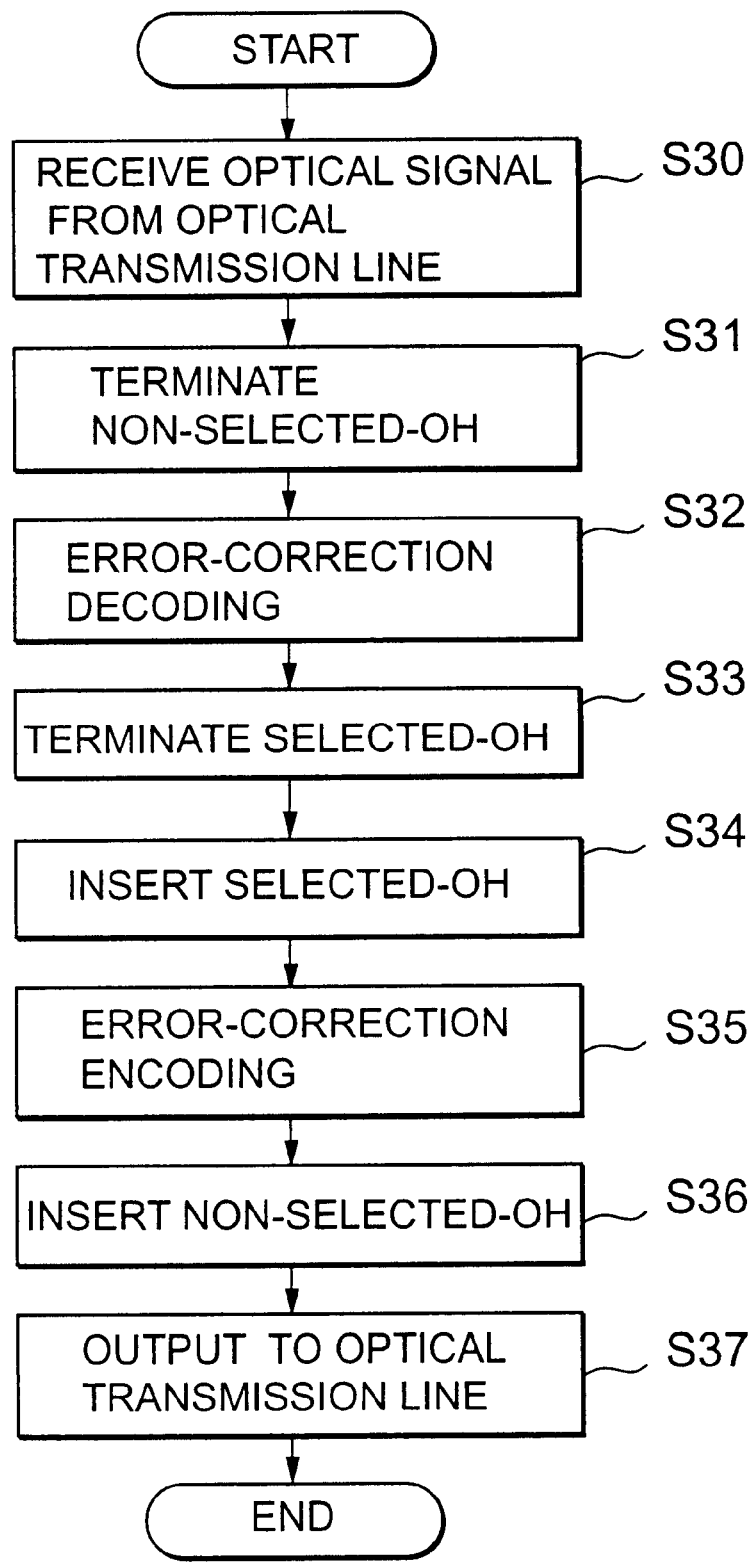
FIG. 8 is a flow chart illustrating an operation of the repeater station as shown in FIG. 7.

Referring to FIG. 8, the transmission operation of the one-direction and opposite-direction transmission systems will be described. When the optical receiver 40 (or 48) receives an optical signal through the optical fiber 105 (or 108) (step S30) the non-selected-OH termination section 41 (or 49) terminates the non-selected overhead of the received signal (step S31). All or part of information of the non-selected overhead such as information for network management is transferred to the non-selected-OH insertion section 54 (or 46). Thereafter, the error-correction decoder 42 (or 50) performs the error-correction decoding of the received signal from which the non-selected overhead is removed (step S32). Then, the selected-OH termination section 43 (or 51) terminates the selected overhead of the output of the error-correction decoder 42 (or 50) (step S33). All or part of information of the selected overhead is transferred to the selected-OH insertion section 52 (or 44).

Thereafter, the selected-OH insertion section 44 (or 52) inserts necessary information into overheads included in the selected overhead portion 201 for error correction processing (step S34). The selected-OH necessary information is generated based on information received from the selected-OH termination section 51 (or 43). The error-correction encoder 45 (or 53) uses the selected overhead and the payload following the selected overhead to perform the error-correction encoding over the selected overhead and the payload (step S35). Thereafter, the non-selected-OH insertion section 46 (or 54) inserts necessary Information into overheads included in the non-selected overhead portion 202 for error correction processing (step S36). The non-selected necessary information Is generated based on information received from the non-selected-OH termination section 49 (or 41). In this manner an optical signal is generated from the output of the non-selected-OH insertion section 46 (or 54) and is transmitted to the optical fiber 107 (or 106) by the optical transmitter 47 (or 55) (step S37).

As described above, in the repeater 5 having the error-correction capability, the error-correction processing of the non-selected overhead is not needed. Therefore, the termination and Insertion is made easy and the total amount of hardware of repeaters in the path is dramatically reduced.

In the above embodiment, the overhead selection is preferably performed depending on whether an overhead byte stores information required for network management. Another overhead selection method can be also employed. Further, the present invention is applicable to a signal other than the STM-16 signal.

Although the above-mentioned embodiments of the present invention have been described herein, it should be apparent to those skilled in the art that this invention may be embodied in many other specific forms without departing from the spirit or scope of the invention. Therefore, the present examples and embodiments are to be considered as illustrative and not restrictive and the invention is not to be limited to the details given herein, but may be modified within the scope of the appended claims.

What is claimed is:

1. A method for transferring a signal from a first termination station to a second termination station through at least one repeater, said signal having a frame structure comprising a plurality of subframes, each said subframe comprising an overhead portion, a payload portion, and an error-correction code portion, said method comprising:
dividing said frame structure into two portions, a first portion being subframes in which the overhead portion of each subframe in said first portion becomes a selected overhead portion to be used for error corrections and a second portion being subframes in which the overhead portion of each subframe in said second portion becomes a non-selected overhead portion not to be used for error correction; and
transferring said signal from said first termination station to said second termination station through said at least one repeater.

2. The method according to claim 1, said method further comprising:
at said first termination station,
inserting first overhead information to said selected overhead portion of said frame to produce an intermediate signal;
performing error-correction encoding of the intermediate signal,
inserting second overhead information to said non-selected overhead portion of the encoded intermediate signal to produce a transmission signal; and
transmitting the transmission signal to said second termination station.

3. The method according to claim 1, further comprising:
at said second termination station,
receiving a signal from said first termination station:
terminating said non-selected overhead portion of a received signal to produce an intermediate signal:
performing error-correction decoding of the intermediate signal; and
terminating said selected overhead portion of the intermediate signal to produce received data.

4. The method according to claim 1, further comprising:
at a repeater,
receiving a signal from said first termination station;
terminating said non-selected overhead portion of the received signal to produce an intermediate signal;
inserting first overhead information to said selected overhead portion of said intermediate signal to produce a transmission signal; and
transmitting the transmission signal to said second termination station.

5. The method according to claim 1, further comprising:
at a repeater,
receiving a signal from said first termination station;
terminating said non-selected overhead portion of a received signal to produce a first intermediate signal,
performing error-correction decoding of the first intermediate signal;
terminating said selected overhead portion of the first intermediate signal to produce a second intermediate signal;
inserting first overhead information to a selected overhead portion of said second intermediate signal to produce a third intermediate signal;
performing error-correction encoding of the third intermediate signal,
inserting second overhead information to said non-selected overhead portion of an encoded third intermediate signal to produce a transmission signal; and
transmitting the transmission signal to said second termination station.

6. The method according to claim 1, wherein said frame structure is divided into said selected overhead portion and said non-selected overhead portion depending on a type of each overhead portion.

7. The method according to claim 6, wherein said frame structure is divided into said selected overhead portion and said non-selected overhead portion depending on whether the overhead portion includes information required for network management.

8. A transmission method for transmitting a signal from a first termination station to a second termination station through at least one repeater, said signal having a frame structure having a plurality of subframes, each of which subframes includes an overhead, a payload, and an error-correction code, said method comprising of:

determining whether said overhead is a selected overhead for error correction, depending on a type of said overhead;

when said overhead is a selected overhead for error correction, performing an error-correction process using information which includes said overhead;

when said overhead is not a selected overhead for error correction, performing said error-correction process using information from which said overhead is removed; and transmitting the signal from said first termination station to said second termination station through said at least one repeater.

9. A system for transferring a signal from a first termination station to a second termination station through a plurality of repeaters, said signal having a frame structure having a plurality of subframes each said subframe comprised of an overhead portion, a payload portion, and an error-correction code portion, said system comprising:

a first termination station;

a second termination station; and at least one repeater, said first termination station comprising:

a first selected-overhead inserting section for inserting first overhead information to said selected overhead portion of said frame to produce a first intermediate signal;

an encoder for performing error-correction encoding of the first intermediate signal;

a first non-selected-overhead inserting section for inserting second overhead information to said non-selected overhead portion of an encoded first intermediate signal to produce a first transmission signal; and a first transmitter for transmitting said first transmission signal to said second termination station, at least one of said at least one repeater comprising:

a first receiver for receiving said first transmission signal from a previous stage;

a first non-selected-overhead terminator for terminating said non-selected overhead portion of a received signal to produce a second intermediate signal;

a second selected-overhead inserting section for inserting third first overhead information to said selected overhead portion of said second intermediate signal to produce a second transmission signal; and a second transmitter for transmitting the second transmission signal to a following stage, and said second termination station comprising:

a second receiver for receiving said second transmission signal from said first termination station through said repeaters;

a second non-selected-overhead terminator for terminating said non-selected overhead portion of said second transmission signal to produce a third intermediate signal;

a decoder for performing error-correction decoding of the third intermediate signal; and a selected-overhead terminator for terminating said selected overhead portion of a decoded third intermediate signal to produce received data.

10. The system according to claim 9, wherein at least one of said at least one repeater comprises:

a third receiver for receiving a signal from a previous stage;

a third non-selected-overhead terminator for terminating said non-selected overhead portion of a received signal to produce a fourth intermediate signal;

a second decoder for performing error-correction decoding of said fourth intermediate signal;

a second selected-overhead terminator for terminating said selected overhead portion of said fourth intermediate signal to produce a fifth intermediate signal:

a second selected-overhead inserting section for inserting first overhead information to a selected overhead portion of said fifth intermediate signal to produce a sixth intermediate signal;

a second encoder for performing error-correction encoding of the sixth intermediate signal:

a third non-selected-overhead inserting section for inserting second overhead information to said non-selected overhead portion of an encoded sixth intermediate signal to produce a third transmission signal; and a third transmitter for transmitting the transmission signal to a following stage.

11. A termination station for transmitting a signal to another termination station through a network including at least one repeater, said signal having a frame structure having a plurality of subframes, each said subframe comprised of an overhead portion, a payload portion, and an error-correction code portion, said termination station comprising:

a first selected-overhead inserting section for inserting first overhead information to a selected overhead portion of said frame to produce a first intermediate signal, said selected overhead portion being any of a subframe whose overhead portion is included in an error-correction encoding;

an encoder for performing said error-correction encoding of the intermediate signal;

a non-selected-overhead inserting section for inserting second overhead information to a non-selected overhead portion of an encoded intermediate signal to produce a transmission signal, said non-selected overhead portion being any of a subframe whose overhead portion is excluded in said error-correction encoding; and a transmitter for transmitting said transmission signal to said another termination station.

12. A termination station for receiving a signal from another termination station through a network including at least one repeater, said signal having a frame structure having a plurality of subframes, each said subframe comprised of an overhead portion, a payload portion, and an error-correction code portion, said termination station comprising:

a receiver for receiving a signal from said another termination station through said network;

a non-selected-overhead terminator for terminating a non-selected overhead portion of a received signal to produce an intermediate signal, said non-selected overhead portion being any of a subframe whose overhead portion is excluded in said error-correction encoding;

a decoder for performing error-correction decoding of the intermediate signal; and a selected-overhead terminator for terminating a selected overhead portion of a decoded intermediate signal to produce received data, said selected overhead portion being any of a subframe whose overhead portion is included in an error-correction encoding.

13. A repeater for receiving a signal from a previous stage and transmitting it to a following stage in a network, said signal having a frame structure having a plurality of subframes each said subframe comprised of an overhead portion, a payload portion, and an error-correction code portion, said repeater comprising:

a receiver for receiving a signal from said previous stage;

a non-selected-overhead terminator for terminating a non-selected overhead portion of a received signal to produce an intermediate signal, said non-selected overhead portion being any of a subframe whose overhead portion is excluded in said error-correction encoding;

a selected-overhead inserting section for inserting first overhead information to a selected overhead portion of said intermediate signal to produce a transmission signal, said selected overhead portion being any of a subframe whose overhead portion is included in an error-correction encoding; and a transmitter for transmitting the transmission signal to said following stage.

14. A repeater for receiving a signal from a previous stage and transmitting it to a following stage in a network, said signal having a frame structure having a plurality of subframes, each said subframe comprised of an overhead portion, a payload portion, and an error-correction code portion, said repeater comprising:

a receiver for receiving a signal from said previous stage;

a non-selected-overhead terminator for terminating a non-selected overhead portion of a received signal to produce a first intermediate signal, said non-selected overhead portion being any of a subframe whose overhead portion is excluded in said error-correction encoding, a decoder for performing error-correction decoding of said first intermediate signal:

a selected-overhead terminator for terminating a selected overhead portion of a decoded first intermediate signal to produce a second intermediate signal, said selected overhead portion being any of a subframe whose overhead portion is included in an error-correction encoding;

a selected-overhead inserting section for inserting first overhead information to a selected overhead portion of said second intermediate signal to produce a third intermediate signal;

an encoder for performing error-correction encoding of said third intermediate signal;

a non-selected-overhead inserting section for inserting second overhead information to said non-selected overhead portion of an encoded third intermediate signal to produce a transmission signal; and a transmitter for transmitting said transmission signal to said following stage.

15. A signal transmission method, comprising:

forming a signal having a frame structure including a predetermined number of subframes, each said subframe having an overhead portion, a payload portion, and a redundant code portion; and for each said subframe, if said subframe is to be a selected-overhead subframe, including said overhead portion of said subframe in an error-correction encoding processing to derive said redundant code portion, and, if said subframe is to be a non-selected-overhead subframe, excluding said overhead portion of said subframe in said error-correction encoding processing for said redundant code.

16. The signal transmission method of claim 15, further comprising:

transmitting said signal.

17. A signal reception method, comprising:

receiving a signal in a receiver, said signal having a frame structure including a plurality of subframes, each said subframe having an overhead portion, a payload portion, and a redundant code portion; and for each said subframe in said signal, determining whether said subframe is a selected-overhead subframe or a non-selected-overhead subframe, each said selected-overhead subframe being a subframe in which the overhead portion is included in the processing for said redundant code portion, each said non-selected-overhead subframe being a subframe in which the overhead portion is not included in the processing for said redundant code.

18. The signal reception method of claim 17, further comprising:

terminating said subframes that are non-selected-overhead subframes of the received signal to produce an intermediate signal;

optionally, inserting overhead information to said overhead portion of said intermediate signal;

producing a transmission signal including said intermediate signal and said selected-overhead subframes; and transmitting the transmission signal to another station, wherein said selected-overhead subframes are not terminated before being re-transmitted to said another station.

19. The signal reception method of claim 17, further comprising.

terminating said subframes that are non-selected-overhead subframes of the received signal;

terminating said subframes that are selected-overhead subframes;

decoding said selected-overhead subframes;

encoding said selected-overhead subframes in an error-correction encoding process that includes said overhead portion of said subframe;

optionally, inserting overhead information to said overhead portion of said non-selected overhead subframes; and transmitting to another station a transmission signal comprising said selected-overhead.

* * * * *